United States Patent [19]
Przelomiec

[11] Patent Number: 5,960,351
[45] Date of Patent: Sep. 28, 1999

[54] RADIO FREQUENCY PLANNING AND ASSIGNMENT IN A DISCONTIGUOUS SPECTRUM ENVIRONMENT

[75] Inventor: Thomas A. Przelomiec, Lynchburg, Va.

[73] Assignee: Ericsson Inc., Research Triangle Park, N.C.

[21] Appl. No.: 08/806,934

[22] Filed: Feb. 26, 1997

[51] Int. Cl.[6] .................................................. H04Q 7/20
[52] U.S. Cl. ........................ 455/450; 455/509; 370/343
[58] Field of Search ................................. 455/447, 448, 455/450, 452, 454, 455, 464, 509, 515, 516, 433, 11.1, 13.1, 453, 62, 63, 449; 370/319, 329, 343, 344, 480, 493, 494, 495, 340, 341, 481; 375/285

[56] References Cited

U.S. PATENT DOCUMENTS

| | | | |
|---|---|---|---|
| 4,479,245 | 10/1984 | Batlivala et al. | 455/503 |
| 4,752,925 | 6/1988 | Thompson | 370/330 |
| 5,109,529 | 4/1992 | Akaiwa . | |
| 5,218,618 | 6/1993 | Sagey . | |
| 5,295,138 | 3/1994 | Greenberg et al. . | |
| 5,345,599 | 9/1994 | Paulraj et al. . | |
| 5,410,737 | 4/1995 | Jones . | |
| 5,430,761 | 7/1995 | Bruckert et al. . | |
| 5,475,866 | 12/1995 | Ruthenberg . | |
| 5,491,837 | 2/1996 | Haartsen . | |

(List continued on next page.)

FOREIGN PATENT DOCUMENTS

| | | |
|---|---|---|
| 0 360 589 | 3/1990 | European Pat. Off. . |
| 0671858A1 | 9/1995 | European Pat. Off. . |
| 0729285A2 | 8/1996 | European Pat. Off. . |
| WO 92/04796 | 3/1992 | WIPO . |
| WO97/36445 | 10/1997 | WIPO . |

OTHER PUBLICATIONS

Ericsson Press Releases, "Ericsson Introduces Downbanded Cellular Technology with First System Launch in Hawaii," 1 page, undated.

Ericsson Info Sheet, "Mobile Telephone—Market Overview," 3 pages update Jan. 7, 1997.

"Auction Notice and Filing Requirements for 1,020 MTA Licenses for Specialized Mobile Radio Service in the 900 MHz Band, Scheduled for Nov. 28, 1995," vol. 60, No. 189, 60 FR 50583, 17 pages, Sep. 29, 1995.

"Mobile Telephony—AMPS and D–AMPS network solutions," 2 pages, undated.

*Ericsson Wireless NOW!*, "Golden opportunity to go cellular," 1 page, 1996.

Technical Description, "RF Guidelines for CMS 8800," Ericsson Inc., 1996.

(List continued on next page.)

*Primary Examiner*—Dwayne D. Bost
*Assistant Examiner*—Jean A. Gelin
*Attorney, Agent, or Firm*—Nixon & Vanderhye P.C.

[57] ABSTRACT

Techniques and systems for formalizing discontiguous spectrum frequency planning maximize system capacity while minimizing the potential for adjacent channel interference. Within the context of an overall system frequency plan, spatial separation can be used to offset overlap resulting from channelization mapping when additional frequencies are not available. Site by site modification and/or design can be used to prevent intermodulation products and/or adjacent channel interference effects. A variety of factors can be taken into account including, for example, control channel position and separation in a new spectrum, probability block utilization, threshold levels for adjacent channel interference, symmetric vs. non-symmetric adjacent channel interference, frequency plan type, Antenna Near Part (ANP) separation, intermodulation effects, local topography, frequency environment conditions, and site availability. These techniques are especially useful for (although not limited to) establishing a downbanded cellular (DBC) radio communication system by overlaying 30 kHz channelization on portions of the Specialized Mobile Radio (SMR) band having 25 kHz channelization.

19 Claims, 14 Drawing Sheets

U.S. PATENT DOCUMENTS

| | | |
|---|---|---|
| 5,495,483 | 2/1996 | Grube et al. . |
| 5,497,503 | 3/1996 | Rydberg et al. . |
| 5,519,691 | 5/1996 | Darcie et al. . |
| 5,521,906 | 5/1996 | Grube et al. . |
| 5,533,008 | 7/1996 | Grube et al. . |
| 5,537,682 | 7/1996 | Miller ........ 455/447 |
| 5,548,809 | 8/1996 | Lemson . |
| 5,551,064 | 8/1996 | Nobbe et al. . |
| 5,572,517 | 11/1996 | Safadi . |
| 5,649,292 | 7/1997 | Doner ........ 455/447 |
| 5,722,043 | 2/1998 | Rappaport et al. ........ 455/447 |
| 5,742,592 | 4/1998 | Scholefield et al. ........ 370/329 |
| 5,752,164 | 5/1998 | Jones ........ 455/501 |
| 5,768,267 | 10/1995 | Raith et al. ........ 370/329 |
| 5,781,859 | 9/1996 | Beasley ........ 455/423 |
| 5,805,645 | 3/1996 | Przelomiec ........ 455/436 |
| 5,862,486 | 3/1996 | Przelomiec ........ 370/343 |

OTHER PUBLICATIONS

Benlaib, Elias, "C/I and C/A in Nominal Cell Patterns," Diploma Work for a Master of Science Degree at Ericsson Radio Systems AB Royal Institute of Technology, Jun. 1995.

Singer, Chapter 7, "Conserving Spectrum," Sec. 7.2 "Cellular Mobile Radio Systems," pp. 81–84.

Steer, David G., "Coexistence and Access Etiquette in the United States Unlicensed PCS Band," pp. 36–43 (*IEEE Personal Communications*, Fourth Quarter 1994).

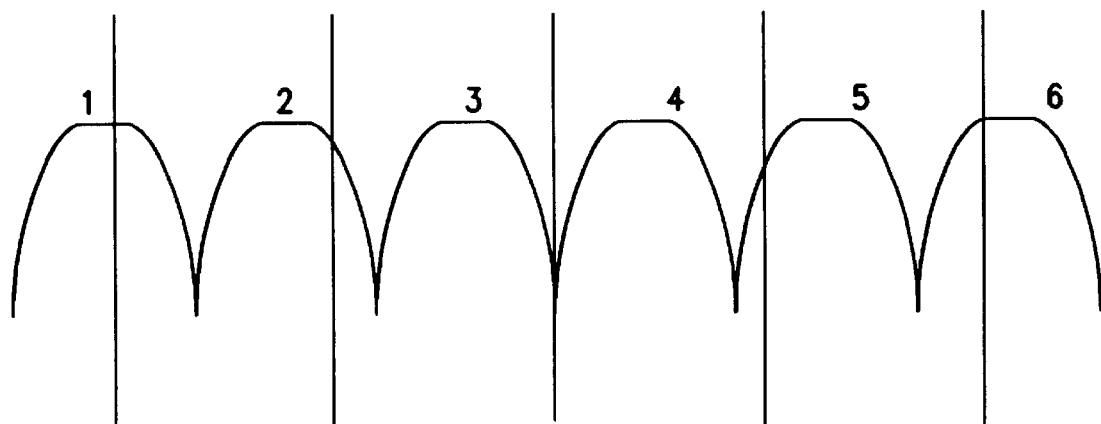
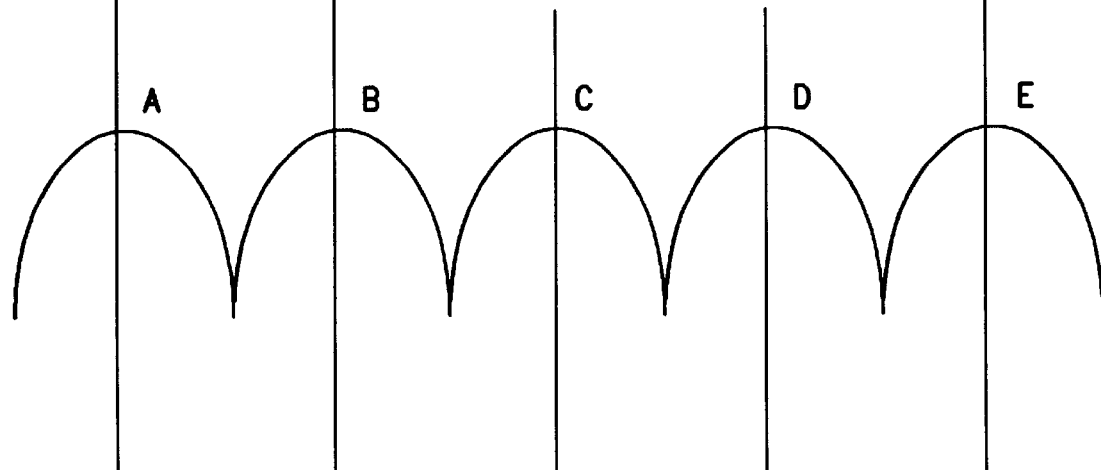
FIG. 1A

Example 7/21 Reuse Pattern

Example 4/12 Reuse Pattern

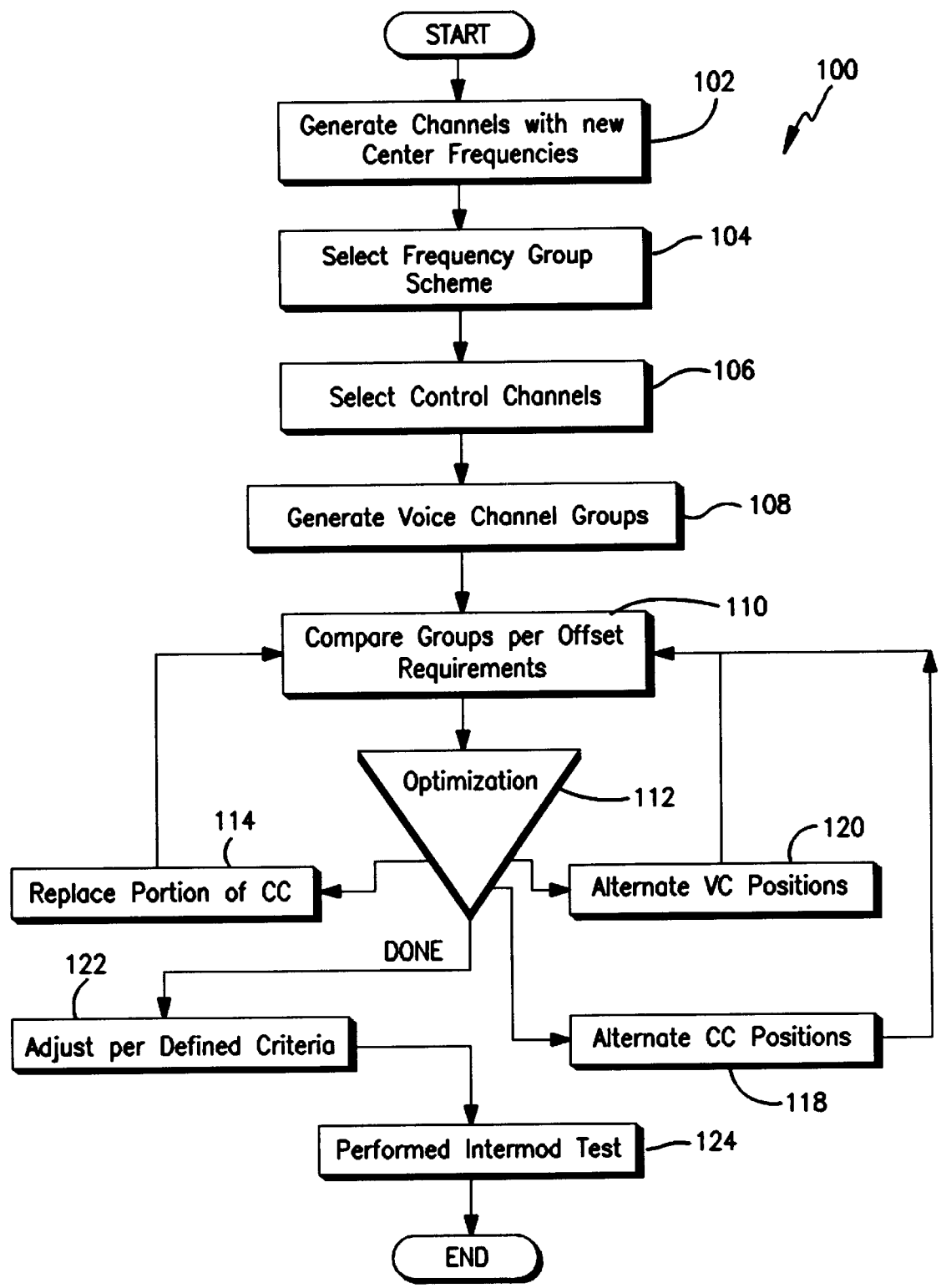
FIG. 4   Example Frequency Allocation Process

Example Discontinuous Frequency Planning System

RADIO FREQUENCY PLANNING AND ASSIGNMENT IN A DISCONTIGUOUS SPECTRUM ENVIRONMENT

FIELD OF THE INVENTION

This invention relates to radio communications, and more specifically to techniques for assigning radio frequencies in a discontiguous spectrum environment. The present invention can be used, among other things, to efficiently convert Specialized Mobile Radio (SMR) radio channels into downbanded cellular (DBC) radio channels while minimizing adjacent channel interference.

BACKGROUND OF THE INVENTION

Cellular telephone has become more popular than anyone imagined. Nearly a hundred million people around the world are now connected to cellular mobile telephone networks. Deregulation, competition, marketing and better technology are driving cellular telephone's phenomenal growth. Even in relatively mature markets, annual growth rate for cellular telephone service can be 60% or more. New mobile networks are being opened all the time. New operators are competing aggressively to capture the consumer market for mobile telephones, positioning the mobile telephone as a genuine, and much more convenient, alternative to owning a normally wired telephone.

As existing cellular systems have continued to grow, they have run into severe capacity problems. There are not enough cellular radio channels to service all of the people who wish to operate and use cellular telephones. Existing cellular system operators are desperate for additional channels they can use to better service their expanding customer base, and new operators wishing to offer competing cellular or other mobile radio services have been clamoring for their own cellular frequency allocations.

In response to this need, the Federal Communications Commission ("FCC")has recently reallocated, for cellular telephone (and other) uses, part of the 18 MHz of radio spectrum previously allocated to the "Specialized Mobile Radio" (SMR) service. Traditionally, SMR frequencies have been operated by small entrepreneurial companies that rent out air time to third parties—usually at a flat monthly fee plus access charges to the public telephone network. To make more efficient use of this spectrum space, the FCC will auction off part of the SMR band to cellular telephone operators and other services. The resulting cellular service, sometimes called "Down Banded Cellular" (DBC) because the SMR band frequencies are below the standard cellular telephone frequencies, allows existing and new cellular telephone operators to expand cellular operations, and also gives present and former SMR operators the opportunity to "go cellular."

Downbanded cellular operators generally want to design and operate systems that are compatible with existing cellular radio equipment and standards. Providing this compatibility has important advantages. By allowing the same cellular telephone unit to access both downbanded cellular channels and conventional cellular channels, downbanded cellular frequencies can act as extensions to conventional cellular frequencies. Calls can be shifted between downbanded cellular frequencies and conventional cellular frequencies based on least cost routing or other techniques—maximizing capacity and making most efficient use of available spectrum space. In addition, users can use cellular telephone units with any cellular or downbanded cellular system that has a "roaming" agreement with a "home" cellular service provider. Cellular telephones can roam from one type of system to another—allowing downbanded cellular systems to become part of national or international cellular telephone networks. Furthermore, using the cellular air interface and conventions for downbanded cellular channels allows downbanded cellular system operators to leverage off of existing cellular technology—dramatically reducing downbanded cellular system development time while providing the latest in cellular telephone features at relatively low cost.

To achieve compatibility with conventional cellular systems, downbanded cellular systems generally must use the same air interface that the conventional cellular systems use. This means using the same channel bandwidth as conventional cellular systems. Most people know that different kinds of radio services often have different channel bandwidths. For example, AM broadcast stations each use a 10 kHz wide channel, while FM broadcast stations take up 20 times that amount of spectrum space. Similarly, cellular telephones generally use 30 kHz wide channels, and cellular telephones and associated equipment have been designed to operate using these channel widths and associated channel spacings. The SMR radio band, in contrast, was long ago divided into channels that are each 25 kHz wide—a bandwidth that is too small to be compatible with widely used cellular air interface requiring 30 kHz channels.

To accommodate existing SMR operators, the FCC is not changing the channelization of the SMR band to 30 kHz. However, the FCC is allowing downbanded cellular operators to operate on the SMR band using 30 kHz wide emissions (or any other technology)—so long as they do not interfere with adjacent channels (and also meet occupied bandwidth requirements). This means that it is possible to use cellular radio equipment designed for 30 kHz channelization on the SMR band—if proper precautions are taken.

A key issue in implementing a downbanded cellular system is the possibility of having an SMR system operating on a 25 kHz channel adjacent to downbanded cellular 30 kHz operation. This situation creates the possibility of adjacent channel interference conditions that are not part of normal cellular operation. Downbanded cellular system operators need an efficient way to come up with a communications system frequency plan that minimizes cochannel and adjacent channel interference (including interference with adjacent SMR channels) while maximizing cell capacity.

SUMMARY OF THE INVENTION

The present invention provides systems, methods and techniques for formalizing discontiguous spectrum frequency planning. The discontiguous spectrum frequency planning in accordance with the invention provides, among other things, a unique method of using adjacent frequencies that occupy different bandwidths. The case for using 30 kHz channels in a nominally 25 kHz environment (the downbanded cellular case) is used for illustration; similar results are achievable for other channel and signaling overlays.

The present invention provides radio communications systems that efficiently use discontiguous spectrum space while also assuring that the potential for adjacent channel interference is minimized. Within the context of an overall system frequency plan, spatial separation can be used to offset overlap resulting from the channelization mapping when additional frequencies are not available. Site by site modification and/or design can be used to prevent intermodulation products and/or adjacent channel interference effects.

The frequency planning systems, methods and techniques provided in accordance with this invention can take into account a variety of factors including, for example:

- control channel position and separation in a new spectrum,
- probability block utilization,
- threshold levels for adjacent channel interference,
- symmetric vs. non-symmetric adjacent channel interference,
- frequency plan type,
- Antenna Near Part (ANP) separation,
- intermodulation effects,
- local topography,
- frequency environment conditions, and
- site availability.

The optimization techniques provide either/or branching, and originate from a variety of software tools with or without automated ties. An example process provided by this invention provides the following steps for frequency planning in a discontiguous spectrum:

- Generate channels with new center frequencies (for example, by mapping blocks of contiguous 25 kHz SMR channels into a reduced number of 30 kHz downbanded cellular channels).
- Select a frequency reuse pattern/group scheme (for example, 3/9, 4/12 or 7/21).
- Calculate upper and lower guard bands for each channel (there are five possible downbanded cellular adjacent channel offsets—27.5, 32.5, 37.5, 42.5 and 52.5 kHz).
- Select control channels (e.g., from the highest probability blocks).
- Generate voice channel groups.
- Check for best isolation for the control channels (for example, those channels with 30 kHz on both Upper Guard Band (UGB) and Lower Guard Band (LGB)).
- Check for frequency offset (for example, do not use channels with a minimal 27.5 kHz offset for control channels).
- Iteratively optimize the resulting frequency plan by replacing portions of the control channel block, alternating control channel positions and/or alternating voice channel positions to achieve the best (or an acceptable) frequency offset.

BRIEF DESCRIPTION OF THE DRAWINGS

These and other features and advantages provided in accordance with the present invention will be better and more completely understood by referring to the following detailed description of presently preferred example embodiments in conjunction with the drawings, of which:

FIG. 1A shows an example mapping of six channels of smaller bandwidth into five channels of larger bandwidth;

FIG. 4 shows an example frequency allocation process;

DETAILED DESCRIPTION OF PRESENTLY PREFERRED EXAMPLE EMBODIMENTS

Overlaying One Channelization Onto Another

Figure 1:
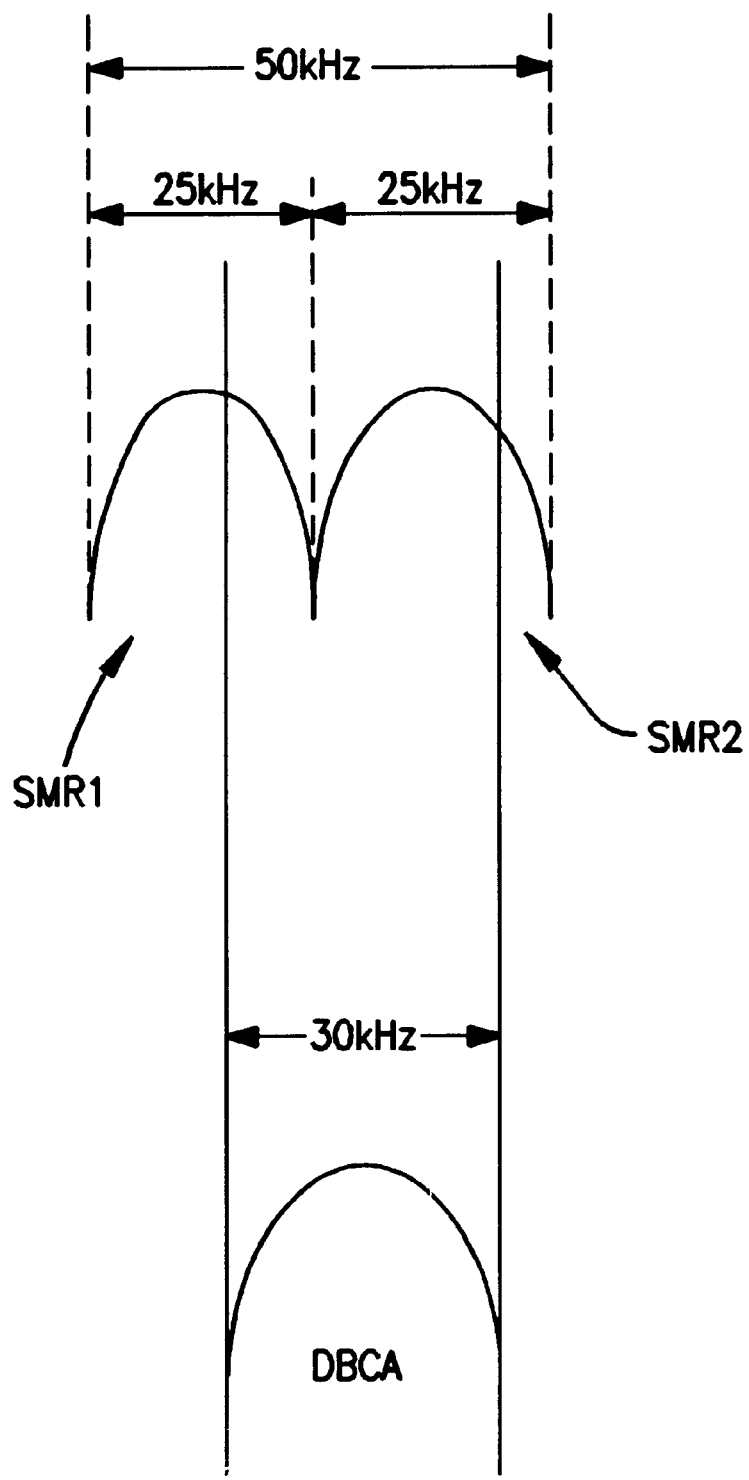
FIG. 1 shows an example mapping of two smaller channels into one larger channel.

FIG. 1 shows an example situation in which a cellular operator owns two 25 kHz wide SMR channels (total of 50 kHz), and wishes to operate a single 30 kHz downbanded cellular channel within that 50 kHz spectrum. 30 kHz of the available 50 kHz will be occupied by the downbanded cellular channel. If the operator owns a further contiguous SMR channel, the remaining 20 kHz can be combined with part of the spectrum for the adjacent contiguous channel to provide an additional downbanded cellular channel. On the other hand, if the downbanded cellular operator does not own an additional contiguous channel, then the remaining 20 kHz of spectrum space may be used to provide guard bands that protect against adjacent channel interference. In the FIG. 1 example (and whenever the operator uses channels that are not coincident with the tipper or lower ends), a buffer of 5 to 20 kHz is created since the 30 kHz channel does not occupy the entire allocated spectrum.

FIG. 1A shows a more complex example in which five 30 kHz downbanded cellular channels are being overlayed onto six 25 kHz bandwidth SMR channels. The following chart illustrates the center frequencies and extent of each of the various channels shown in FIG. 1.

TABLE I

| SMR Channel Number | Bottom Freq. | Center Freq. | Top Freq. |
|---|---|---|---|
| 1 | x.0000 | x.0125 | x.0250 |
| 2 | x.0250 | x.0375 | x.0500 |
| 3 | x.0500 | x.0625 | x.0750 |
| 4 | x.0750 | x.0875 | x.1000 |
| 5 | x.1000 | x.1125 | x.1250 |
| 6 | x.1250 | x.1375 | x.1500 |

| DBC Channel Number | Bottom Freq. | Center Freq. | Top Freq. |
|---|---|---|---|
| A | x.0000 | x.0150 | x.0300 |
| B | x.0300 | x.0450 | x.0600 |
| C | x.0600 | x.0750 | x.0900 |
| D | x.0900 | x.1050 | x.1200 |
| E | x.1200 | x.1350 | x.1500 |

The new 30 kHz channel spacing impacts the guard band requirement due to the channel center offset and limited overlap of the occupied bandwidth. A reduction in the energy occupied in adjacent channels occurs due to the offset from the standard 25 kHz channel centers. For example, suppose the operator owns SMR channels 2 and 3. SMR channels 2 and 3 occupy from x.0250 to x.0750 MHz. DBC channel B will occupy from x.0300 to x.0600 MHz with a 5 kHz lower guard band and a 15 kHz upper guard band. DBC channel B thus may experience reduction in energy occupied in adjacent channels due to offset from standard 25 kHz centers.

Figure 2:
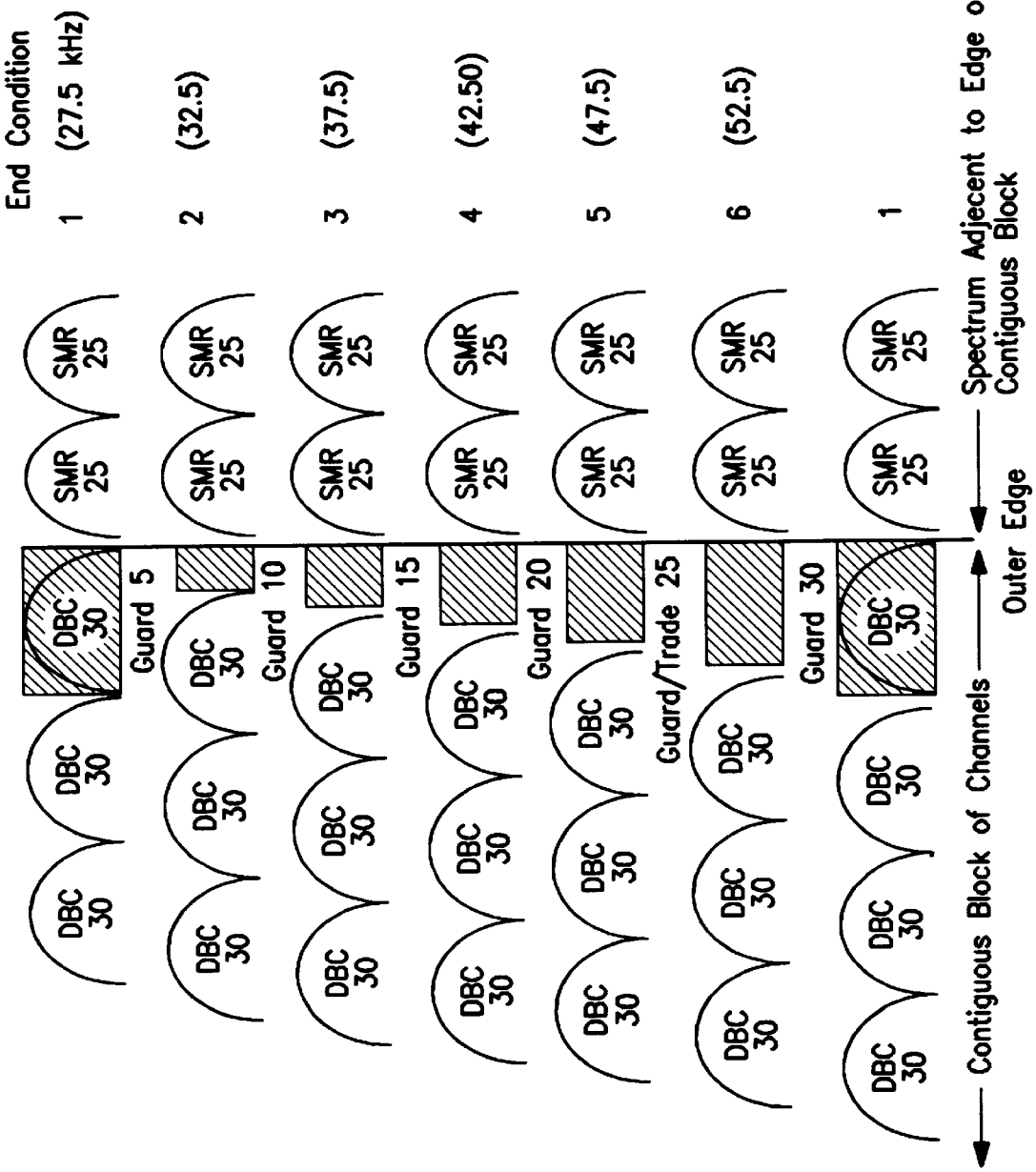
FIG. 2 shows example end conditions.

In this example, there are five possible offsets of the 30 kHz channel center frequency relative to the 25 kHz channel center frequency: 27.5 kHz, 32.5 kHz, 37.5 kHz, 42.5 kHz, and 52.5 kHz. FIG. 2 shows the end conditions for each of these various offsets. The end condition discussed above providing a 15 kHz upper guard band is shown in the center of FIG. 2 (end condition 4). As FIG. 2 illustrates, different tipper guard bandwidths are provided depending on the DBC channel center frequencies relative to the SMR channels.

A sufficient end condition guard band must be provided to prevent adjacent channel interference. Potential interference with an adjacent SMR channel is worst for the 27.5 kHz offset. On the other hand, a downbanded cellular operator usually wants to maximize usage of the spectrum space available. While providing an entire DBC channel bandwidth (30 kHz) as a guard band may adequately protect against adjacent channel interference, a guard band this wide may be wasteful of spectrum space and may not be necessary to adequately address potential adjacent channel interference problems.

When frequencies are not available, smaller guard bands may be used in conjunction with spatial separation provided as part of an overall system frequency reuse plan to avoid adjacent channel interference problems. Due to the limited amount of available RF spectrum, the scarcity of channels available to each operator (and the fact that most available downbanded cellular frequencies are non-contiguous for most operators), frequencies must be reused throughout the system to increase network capacity. RF frequencies can be assigned within an overall system to minimize co-channel and adjacent channel interference between sites.

Frequency Reuse within a Cellular System

Figure 3A:
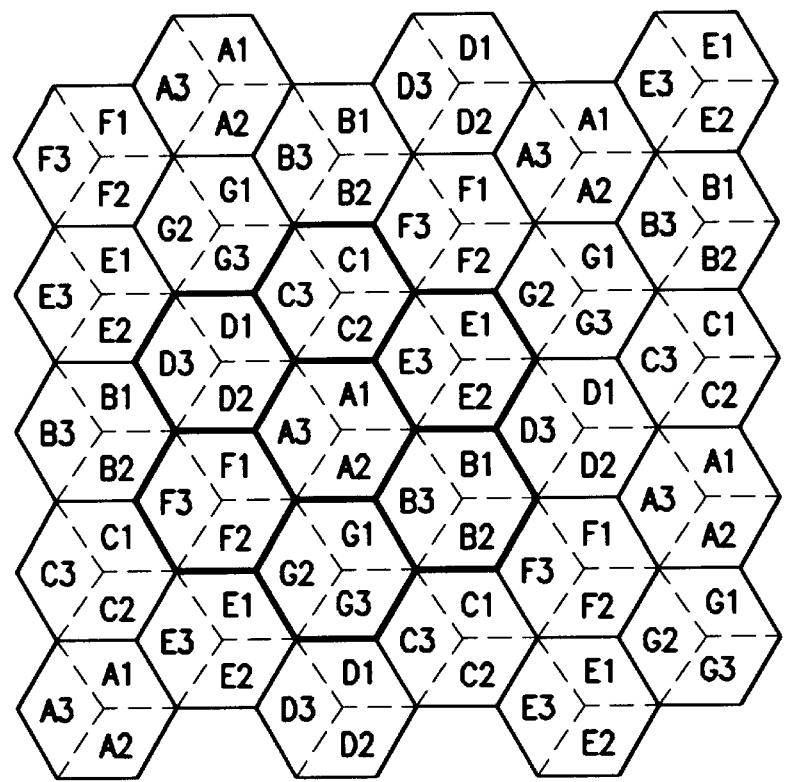
FIGS. 3A and 3B show example frequency reuse plans.
Figure 3B:
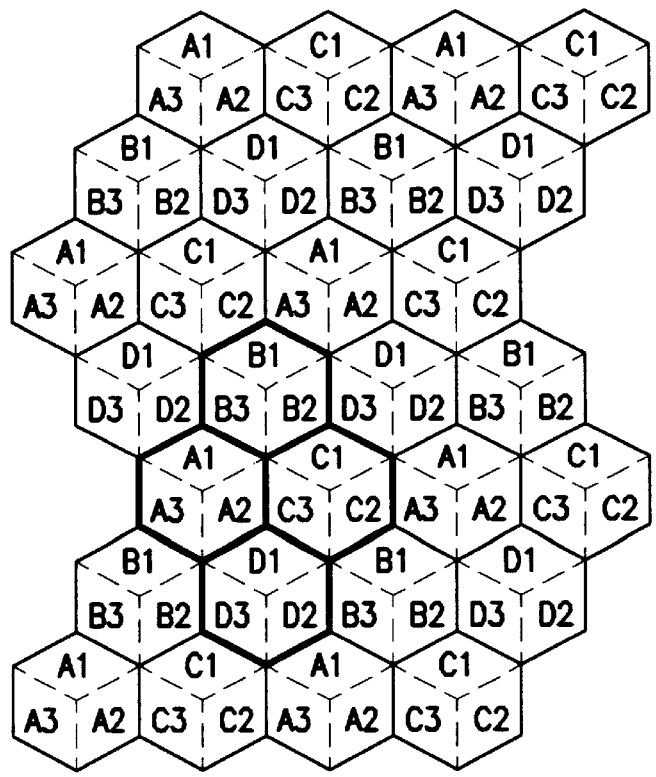

Frequency reuse within a downbanded cellular system may be based on hexagonal cell groupings called "clusters." The size of the cluster will determine how the cluster is repeated throughout the network (i.e., the reuse pattern). The frequency reuse patterns are designated as N/F, where N is the number of cell sites in a cluster and F is the number of frequency groups within a cluster. FIG. 3A shows an example "7/21" pattern and FIG. 3B shows an example "4/12" pattern. In the FIG. 3A 7/21 plan, each cluster has 7 cell sites (A, B, . . . G) and 21 frequency groups (A1, A2, A3, . . . G1, G2, G3). In the example shown, G2 and G3 are switched in the pattern so as to prevent interference because A1 and G3 are adjacent). In the example 4/12 pattern shown in FIG. 3B, there are 4 cell sites and 12 frequency groups in each cluster. In each case, there is no frequency reuse within a cluster. Both digital voice channels and digital control channels can be assigned to any channel within the band. Channels should be assigned to minimize adjacent channel interference.

The frequency plan chosen will depend on the desired carrier-to-interference (C/I) and the required capacity. The need to reuse frequencies results in the presence of co-channel and adjacent channel interference. Plans that tend to yield the most desirable C/I will support the least capacity. It is up to the system designer to choose a plan that will meet C/I requirements while supporting the current and future capacity needs. The C/I depends on a number of complex factors including co-channel interference, adjacent channel interference, and/or intermodulation. In downbanded cellular, there is a possibility of a DBC channel interfering with an adjacent SMR channel or vice versa. The use of properly developed frequency plans can help to reduce the levels of interference present in a system. Adjacent channel interference can be minimized by providing physical separation between adjacent sites. Intermodulation (the mixing of two frequencies in a non-linear device resulting in a product frequency that can appear as on-channel interference at a receiver) is also a potential interference problem that may be taken into account. It is desirable to minimize each of these interference sources while maximizing traffic handling capacity.

Example Frequency Planning Process

FIG. 4 shows an example overall process 100 for developing a frequency plan involving discontiguous channels (e.g., as may occur within a downbanded cellular radio communications system) that minimizes interference and maximizes capacity. The first step in the process is to generate channels with new center frequencies (FIG. 4, block 102). For example, this may involve determining the center frequencies of the applicable downbanded cellular channels in accordance with the following:

TABLE II

| Transmitter | Channel Number | Center Frequency (MHz) |
|---|---|---|
| Mobile | $1 \leq N \leq 600$ | $0.030 N + 805.980$ |
| Base | $1 \leq N \leq 600$ | $0.030 N + 805.980$ |

The next step in the example process (FIG. 4, block 104) is to select a frequency group (reuse) scheme (e.g., 7/21, 4/12 or 3/9) (see FIGS. 3A and 3B for example). As discussed above, in the 7/21 plan, frequencies are set in 7 site clusters with 3 sectors (cells) per site resulting in 21 total sectors (cells). Each sector (cell) has an associated frequency set or group number. A general case associates the letters A through G with each site and the number 1 through 3 for each cell in the site.

The next step in the example process 100 is to select control channels (FIG. 4, block 106). Each cell requires a separate control channel. The IS-136 standard digital control channel is a single time slot within a three slot 30 kHz channel. Control channel selection should be used to reduce control channel acquisition time, but this requirement may be offset by adjacent channel isolation requirements. The following table shows the required separation ("frequency offset"between channnels in a frequency set:

TABLE III

| IS-136 Based | 3/9* | 4/12* | 7/21 |
|---|---|---|---|
| Site to Site Separation (A to B, B to C, etc.) | 30 kHz | 30 kHz | 30 kHz |
| Group to Group Separation (A1 to A2 or A3) | 90 kHz | 120 kHz | 210 kHz |
| Within Group (A1 to A1) | 270 kHz | 360 kHz | 630 kHz |

*Not Recommended But possible to be used

Any successful plan will meet or exceed these offset requirements.

Assuming frequencies are available, it is desirable to assign control channels based on "probability blocks." Mobile stations are programmed to search for digital control channels beginning in blocks with the highest relative probability. The following table shows example probability block assignments for downbanded cellular based on channel member:

TABLE IV

Probability Block Assignments for DBC

| Block Number | Channel Number | Relative Probability |
|---|---|---|
| 1 | 1–45 | 16 (Lowest) |
| 2 | 46–82 | 12 |
| 3 | 83–119 | 11 |
| 4 | 120–156 | 10 |
| 5 | 157–193 | 6 |
| 6 | 194–230 | 2 |
| 7 | 231–267 | 4 |

TABLE IV-continued

Probability Block Assignments for DBC

| Block Number | Channel Number | Relative Probability |
|---|---|---|
| 8 | 268–304 | 8 |
| 9 | 305–341 | 9 |
| 10 | 342–378 | 1 (Highest) |
| 11 | 379–415 | 3 |
| 12 | 416–452 | 5 |
| 13 | 453–489 | 7 |
| 14 | 490–526 | 13 |
| 15 | 527–563 | 14 |
| 16 | 564–600 | 15 |

Assuming that interference issues can be resolved, channels 342–378 and 194–230 make the best control channels because cellular radios will find them most rapidly. While the probability blocks associated with downbanded cellular recommend a particular search order for the control channels, process 100 also evaluates control channel selection based on best isolation and minimum offset.

The next step in example process 100 is to generate voice channel groups (FIG. 4, block 108). In the preferred example, certain individual or groups of channels may be removed to avoid certain offsets, and the remaining channels are then assigned to frequency groups.

Process 100 then compares the groups based on the offset requirements of Table III above (FIG. 4, block 110). If offset requirements are not met, an optimization 112 is iteratively performed until desired frequency separation is achieved (FIG. 4, block 112). The optimization process in the preferred example involves iteratively replacing a portion of the control channel block with alternate selections, and determining if correct separation is achieved (FIG. 4, block 114).

If block 114 is successful in achieving correct frequency separation, the optimization step 112 recognizes this and stops optimizing ("done" exit to block 112). On the other hand, if block 114 is not successful, then it is iteratively performed until all alternate control channels have been used (blocks 110, 112, 114). In the preferred example, if replacement of portions of the control channel block does not result in the required separation, then process 100 tries using alternate control channels (FIG. 4, block 118). This process of trying alternate control channels may continue iteratively until either correct separation has been achieved or all possible control channel positions have been tried (block 112). As before, if correct separation is achieved at this point, the frequency plan is changed to use the alternate control channels ("done" exit to block 112). If iteratively performing block 118 is not successful in providing the required separation, process 100 tries to obtain the desired separation by using alternate voice channel positions (FIG. 4, block 120). For example, block 120 may involve moving voice channels to alternate groups—after which the revised plan is tested to see if offset problems are reduced (blocks 120, 110).

Once optimization block 112 indicates completion, the channel plan is adjusted to achieve best separation (block 122, FIG. 4). In this example, step 122 involves separating the 27.5 kHz offset frequencies so that there are a minimum number within each channel group. This step may also be iteratively repeated until all groups have less than or equal to the maximum number of selected offset frequencies. Finally, the resulting frequency plan may be tested for intermodulation products and other factors on a cell-by-cell and site-by-site basis (FIG. 4, block 124).

Example Automated Frequency Planning System

Figure 5:
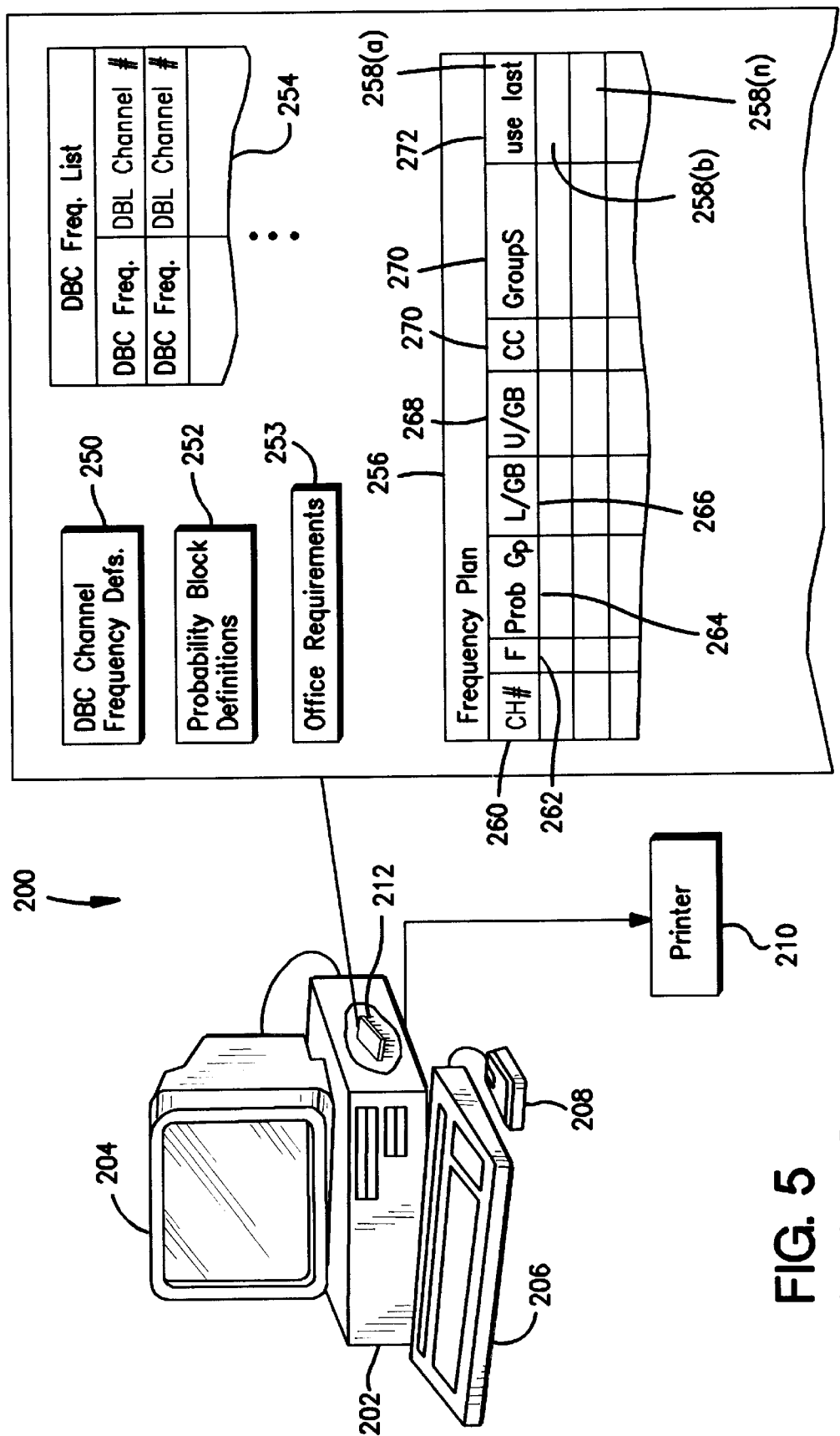
FIG. 5 shows an example frequency planning system provided in accordance with the invention.

FIG. 5 shows an example discontiguous radio frequency planning and assignment system 200 provided in accordance with the preferred embodiment of this invention. System 200 may include, for example, a conventional IBM compatible personal computer 202 including a display 204, a keyboard 206, a mouse pointing device 208, and a printer 210. A user inputs data into computer 202 via keyboard 206 (and/or by other means such as, for example, via a modem, telecommunications network, floppy diskette, or the like). Computer 202 performs the process shown in FIG. 4 and creates, within an internal memory device such as a RAM 212, various data structures that are then used to assign frequencies within a downbanded cellular radio system.

FIG. 5 shows an example "map" of computer memory 212 including various data structures, such as, for example:

DBC channel frequency definitions 250 (see Table II above), probability block definitions 252 (see Table IV above), offset requirements 253 (see Table III)

an available DBC frequency list 254, and a frequency plan 256.

Computer 202 builds frequency plan 256 by performing the steps shown in FIG. 4. The frequency plan 256, when completed, specifies what frequency should be assigned within each site of a frequency reuse cluster of a downbanded cellular radio frequency telecommunications system. At the conclusion of the FIG. 4 process 100, system 200 uses printer 210 to print out the frequency plan 256. This printed plan is then used to set the frequency synthesizers of each of the radio repeaters within a downbanded cellular communications system. In another example, computer 202 may output frequency plan 256 in the form of a data file which may then be used by a system manager computer to automatically set radio repeater frequency synthesizers.

In this example, the frequency plan has a number of channel records 258 each of which includes a number of different fields such as:

channel number field 260, channel frequency field 262, probability group field 264 (indicating which probability group, based on probability block definitions 252, the channel falls within), lower guard band field 266 (in MHz—this value will be typically 0, 5, 10, 15, 20, 25 or 30 MHz), upper guard band field 268 (in MHz—this value will be typically 0, 5, 10, 15, 20, 25 or 30 MHz), a control channel field 270 (indicating whether or not the channel has been assigned as a control channel or alternate control channel), a group field 270 (indicating which group(s) the channel has been assigned to), and a "use last" flag 272 (indicating that the channel should be used last because of potential adjacent channel interference problems).

In this example, control channel field 270 may indicate assignment as a control channel or as an alternate control channel. The "group" field 270 may include several (for example, three) alternate listings within the same cluster group (e.g., A2, B3, C1, G1) indicating whether or not the channel is assigned as a control channel.

Example More Detailed Frequency Planning Process

Figure 5A:
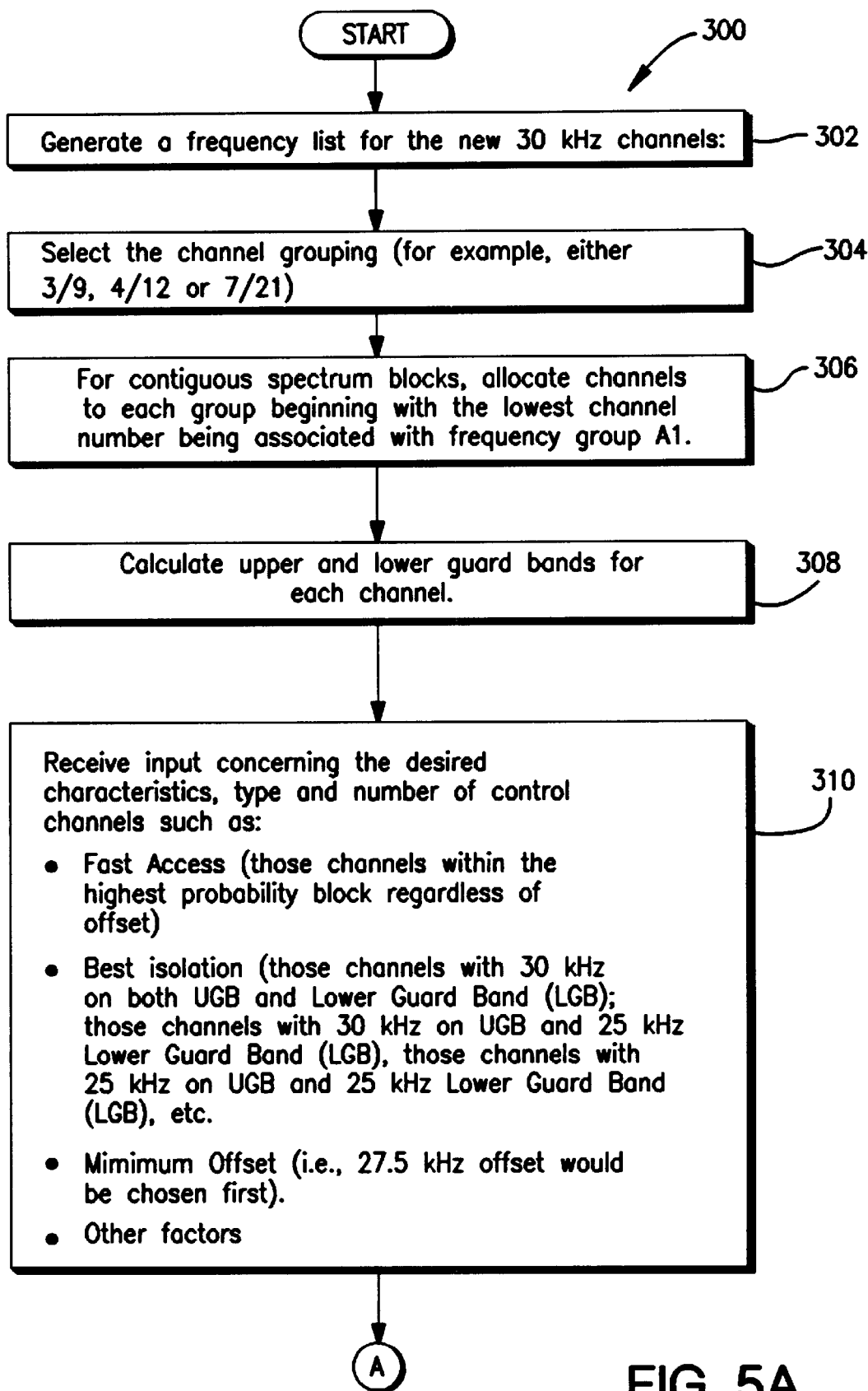
FIGS. 5A–5G show more detailed frequency allocation examples.

FIGS. 5A–5G show a more detailed example of a process 300 performed by frequency planning system 200. In this more detailed example, computer 202 begins by generating the frequency list 254 for the new 30 kHz channels (FIG. 5A, block 302). Computer 202 creates list 254, for example, by associating the appropriate channel numbers, determining the probability block for each channel, removing individual or groups of channels, and creating a first pass channel plan 256 using default channel groupings.

Computer 202 may ask a human user to select the channel grouping (FIG. 5A, block 304). For contiguous spectrum blocks, computer 202 then allocates channels to each group beginning with the lowest channel number being associated with frequency group A1 (FIG. 5A, block 306). Computer 202 may next calculate upper and lower guard bands for each channel (FIG. 5A, block 308). The control channel selecting process to be performed later may put higher weight on lower guard bands due to non-symmetrical interference.

Computer 202 may next receive input from a user concerning the desired characteristics, type and number of control channels (FIG. 5A, block 310). Such input may include, for example:

fast access (those channels within the highest probability block regardless of offset), best isolation (those channels with 30 kHz on both the upper and lower guard bands, those channels with 30 kHz on the upper guard band and 25 kHz on the lower guard band, those channels with 25 kHz on both upper and lower guard bands, etc.), minimum offset, other factors.

Figure 5B:
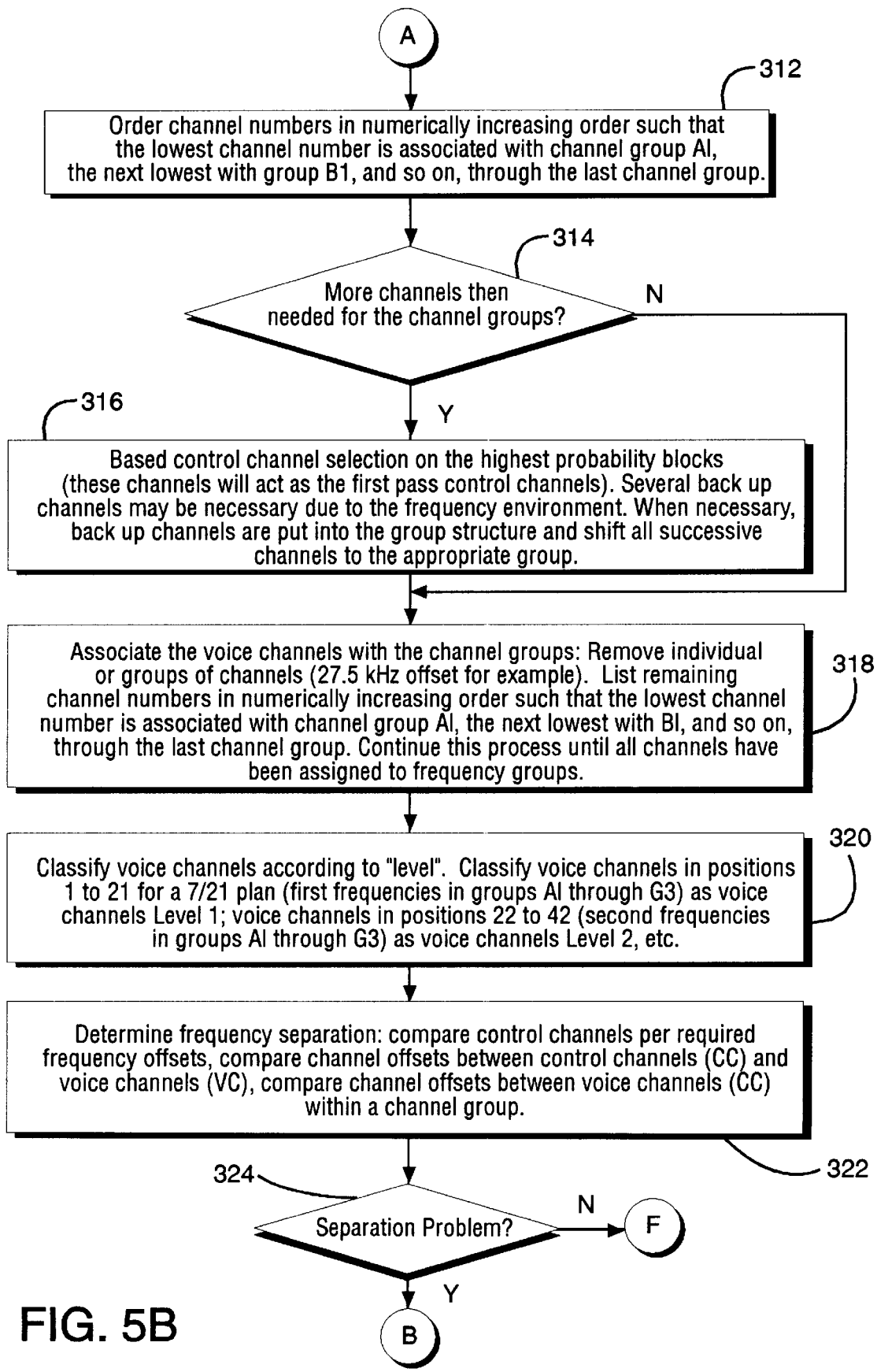

Computer 202 may next order the channel numbers within frequency list 254 in numerically increasing order such that the lowest channel number is associated with channel group A1, the next lowest with group B1, through the last channel group to create a first pass channel plan using the channel grouping selected in block 304 (FIG. 5B, block 312). Computer 202 may then determine whether it has more channels than are needed for the channel groups (FIG. 5B, decision block 314). If so ("yes" exit to decision block 314), this will impact control channel selection. In particular, control channel selection may be based on the highest probability blocks (see data structure 252)—while also providing several backup channels due to the frequency environment (FIG. 5B, block 316). When necessary, computer 202 may put backup channels into the group structure and shift all successive channels to the appropriate group (block 316).

Computer 202 next associates the voice channels with the channel groups (FIG. 5B, block 318). To perform this task, computer 202 may remove individual (or groups of) channels (for example, all channels with 27.5 kHz offsets). Computer 202 may then list remaining channel numbers in numerically increasing order such that the lowest channel number is associated with channel group A1, the next lowest with B1, and so on, through the last channel group—until all channels have been assigned to frequency groups (FIG. 5B, block 318). This information is recorded within the group fields 270 of frequency plan 256.

Computer 202 may next classify all voice channels according to "level" (FIG. 5B, block 320). All voice channels in positions 1 to 21 (first frequencies in groups A1 through G3) may be classified as "level one" voice channels, all voice channels in positions 22 to 42 (second frequencies in groups A1 through G3) may be classified as "level two" voice channels, etc. (FIG. 5B, block 320). Computer 202 next determines the frequency separation between the various channels by comparing the channel offsets between control channels and other control channels, between control channels and voice channels, and between voice channels within the channel groups (FIG. 5B, block 322).

Computer 202 then determines whether the offset requirements 253 of Table III are met (FIG. 5B, decision block 324). If the offset requirements are met ("no" exit to decision block 324), the computer 202 skips to near the end of the overall process to check intermodulation products (see FIG. 5G). In the more usual case, however, there will be some separation problems ("yes" exit to decision block 324) that computer 202 must resolve.

Figure 5C:
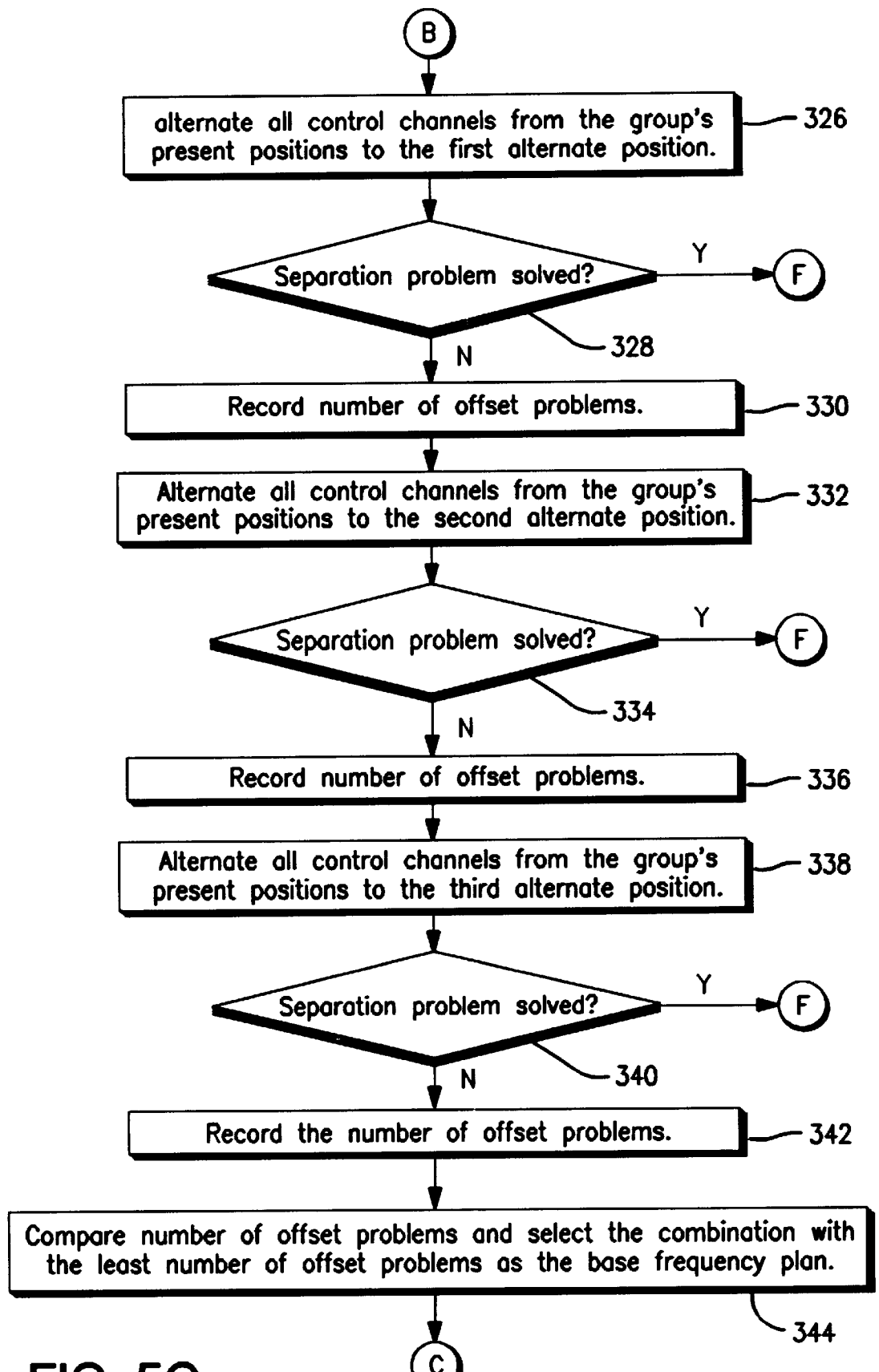

To resolve separation problems, computer 202 may first attempt to alternate all control channels from their present position within a group to a first alternate position (FIG. 5C, block 326). If this solves the separation problem ("yes" exit to decision block 328), computer 202 may proceed to near the end of the process. If this does not solve the separation problems ("no" exit to decision block 328), computer 202 records the number of offset problems (FIG. 5C, block 330) and then alternates all control channels from their present positions to their second alternate position (FIG. 5C, block 332). If this new resulting plan 256 resolves all offset problems ("yes" exit to decision block 334), computer 202 proceeds to the steps shown in FIG. 5G. Otherwise ("no" exit to decision block 334), computer 202 records the number of offset problems (FIG. 5C, block 336) and tries alternating the control channels to their third alternate position (FIG. 5C, block 338). If this step solves the separation problems ("yes" exit to decision block 340), the computer is done and proceeds to the steps shown in FIG. 5G. Otherwise, computer 202 records the number of offset problems resulting from this case (FIG. 5C, block 342), and then compares the number of offset problems recorded by each of blocks 330, 336, 342, to select the combination with the least number of offset problems (FIG. 5C, block 344). This selected combination becomes the new base frequency plan 256.

Figure 5D:
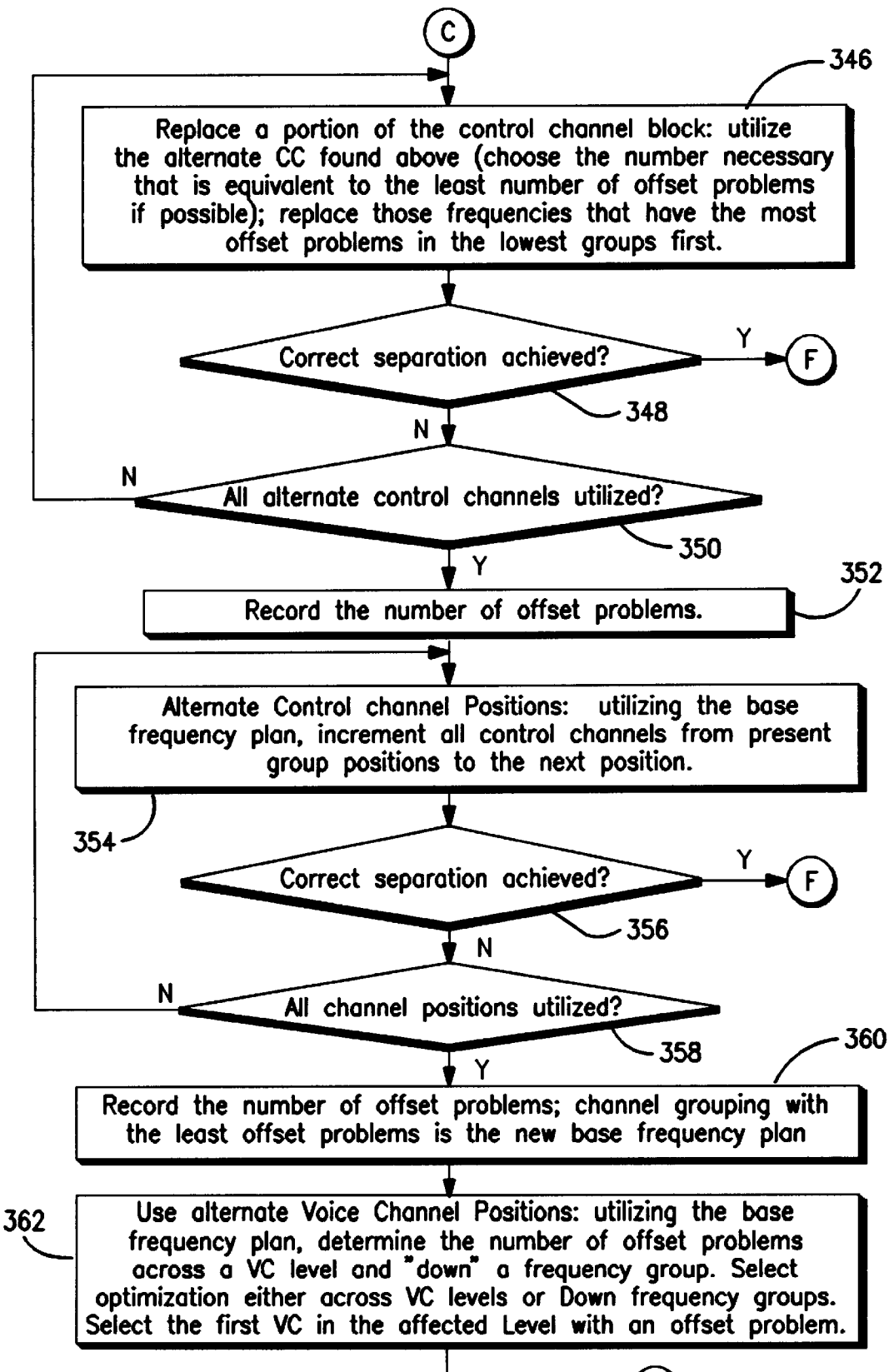

Computer 202 may next attempt to optimize the base plan 256. In this example, the optimization involves iteratively performing a number of different substitutions and adjustments to the base frequency plan 256. Computer 202 may first replace only a portion of the control channel block, using the alternate control channels found in steps 326–344 (FIG. 5D, block 346). In this example, computer 202 may choose the number of alternate control channels necessary that is equivalent to the least number of offset problems if possible, and replace those frequencies that have the most offset problems in the lowest groups first. Computer 202 iteratively performs block 346 until correct separation is achieved (FIG. 5D, decision block 348) or until all alternate control channels have been tried (FIG. 5D, decision block 350). If this iterative process does not result in correct separation, computer 202 records the number of offset problems (FIG. 5D, block 352) and then begins attempting to alternate the control channel positions within the frequency plan (FIG. 5D, block 354). Computer 202 may iteratively alternate control channel positions by incrementing all control channels within the base plan 256 from present group positions to the next position until correct separation is achieved or until all channel positions have been tried (block 354, decision blocks 356, 358). If this iterative process is not successful in achieving correct separation, computer 202 records the number of offset problems and modifies the base plan 256 to use the channel grouping with the least number of offset problems (FIG. 5D, block 360).

Figure 5E:
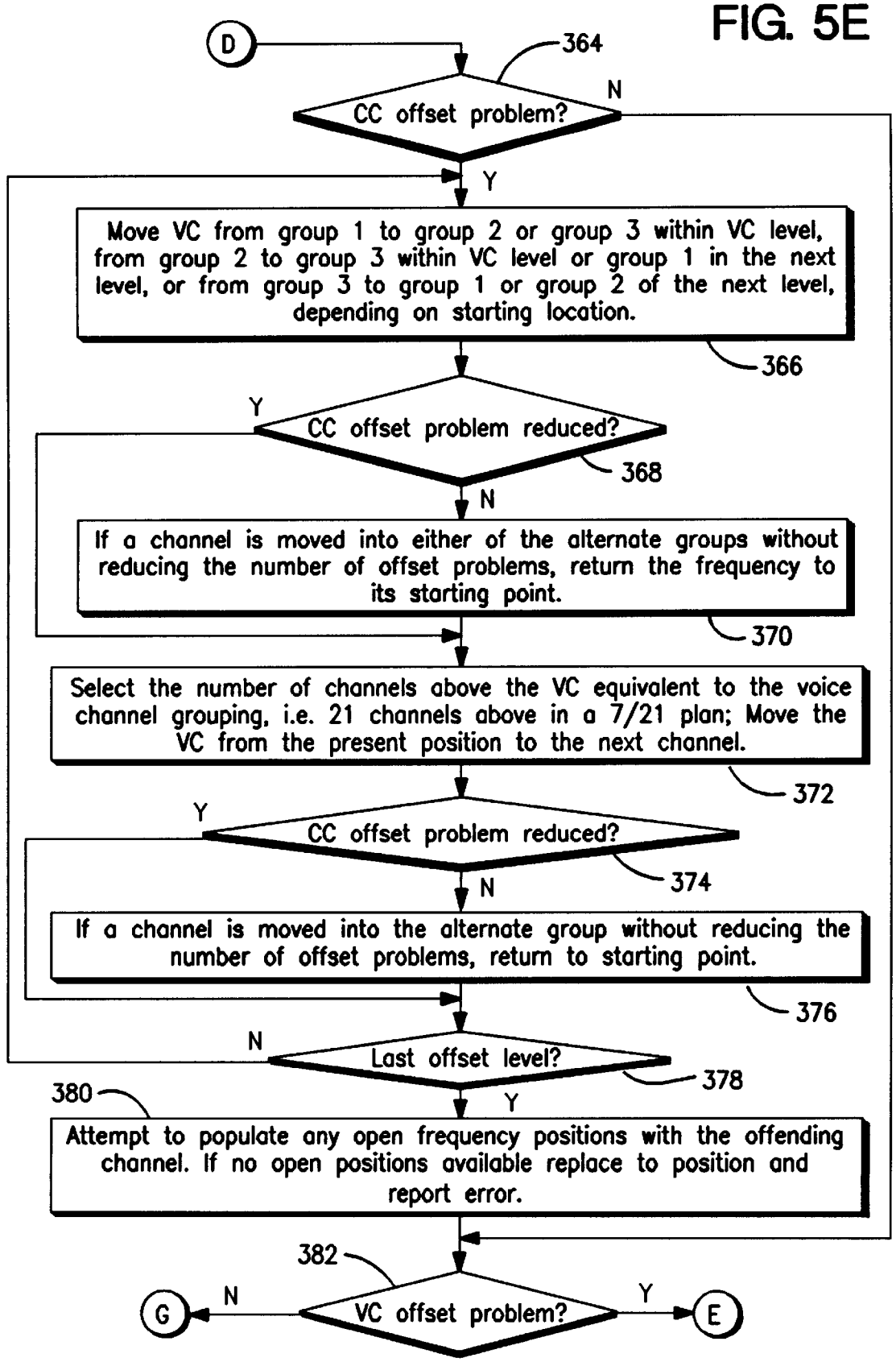

Computer 202 may next attempt to optimize the base frequency plan 256 by using alternate voice channel positions. To begin this process, the computer examines base frequency plan 256 to determine the number of offset problems across a voice channel level and down a frequency group—selecting optimization either across levels or down group (FIG. 5D, block 362). Computer 202 may select the first voice channel in the affected level with an offset problem as a starting point (block 362). Computer 202 may determine whether this particular voice channel has a control channel offset problem (i.e., whether the offset problem exists because of insufficient frequency spacing between the voice channel and a control channel) (FIG. 5E, block 364). If there is a control channel offset problem ("yes" exit to decision block 364), computer 202 moves a voice channel from one group to another sequentially depending upon starting location and determines whether the control channel offset problem is reduced or eliminated (FIG. 5E, blocks 366, 368). If the shift from one group to another does not reduce the number of offset problems, the voice channel is returned to its original position ("no" exit to decision block 368, block 370). Computer 202 may also select a number of channels above the voice channel equivalent to the voice channel grouping and move the voice channel from its present position to the next channel (FIG. 5E, block 372). If this does not reduce the offset problem, the channel is returned to its starting point (decision block 374, block 376 of FIG. 5E). Computer 202 may iteratively perform blocks 366–376 until the last offset level has been reached ("yes" exit to decision block 378), and may then attempt to populate any open frequency positions with any "problem" channel. If no open positions are available, the computer 202 may replace it in its starting position and report an error (FIG. 5E, block 380).

Figure 5F:
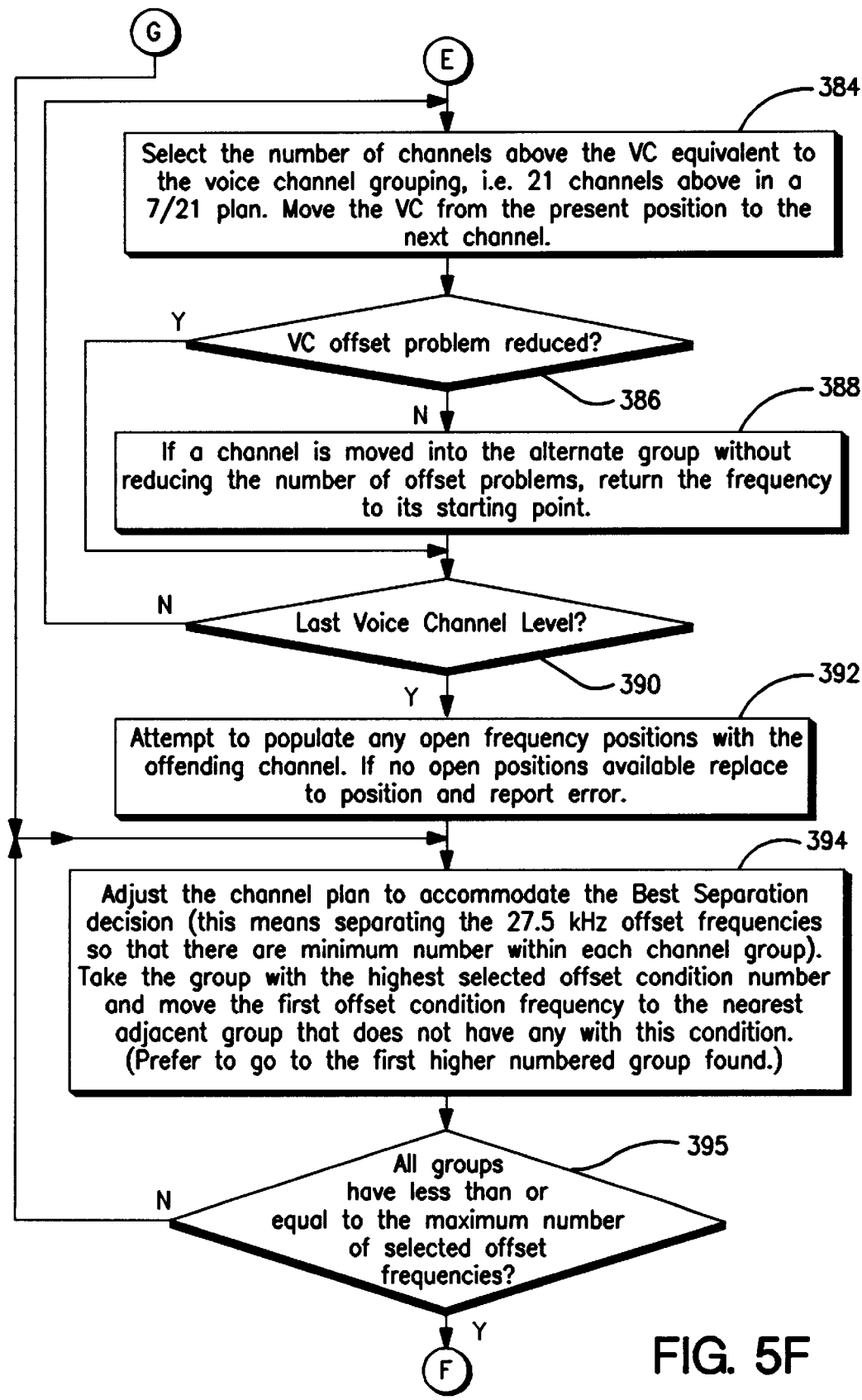

Computer 202 may next determine whether there is an offset problem between the voice channel and another voice channel (decision block 382). If there is such an offset problem, computer 202 may select the number of channels above the voice channel equivalent to the voice channel grouping and move the voice channel from its present position to the next channel (FIG. 5F, block 384)—determining whether the offset problem is reduced and moving the channel back to its starting position if it is not (FIG. 5F, decision block 386, block 388). Steps 384, 386, 388 may be iteratively performed until the last voice channel is reached (FIG. 5F, block 390)—at which time computer 202 may attempt to populate any open frequency positions with the offending channel. Computer 22 may report an error if no open positions are available (FIG. 5F, block 392).

Figure 5G:
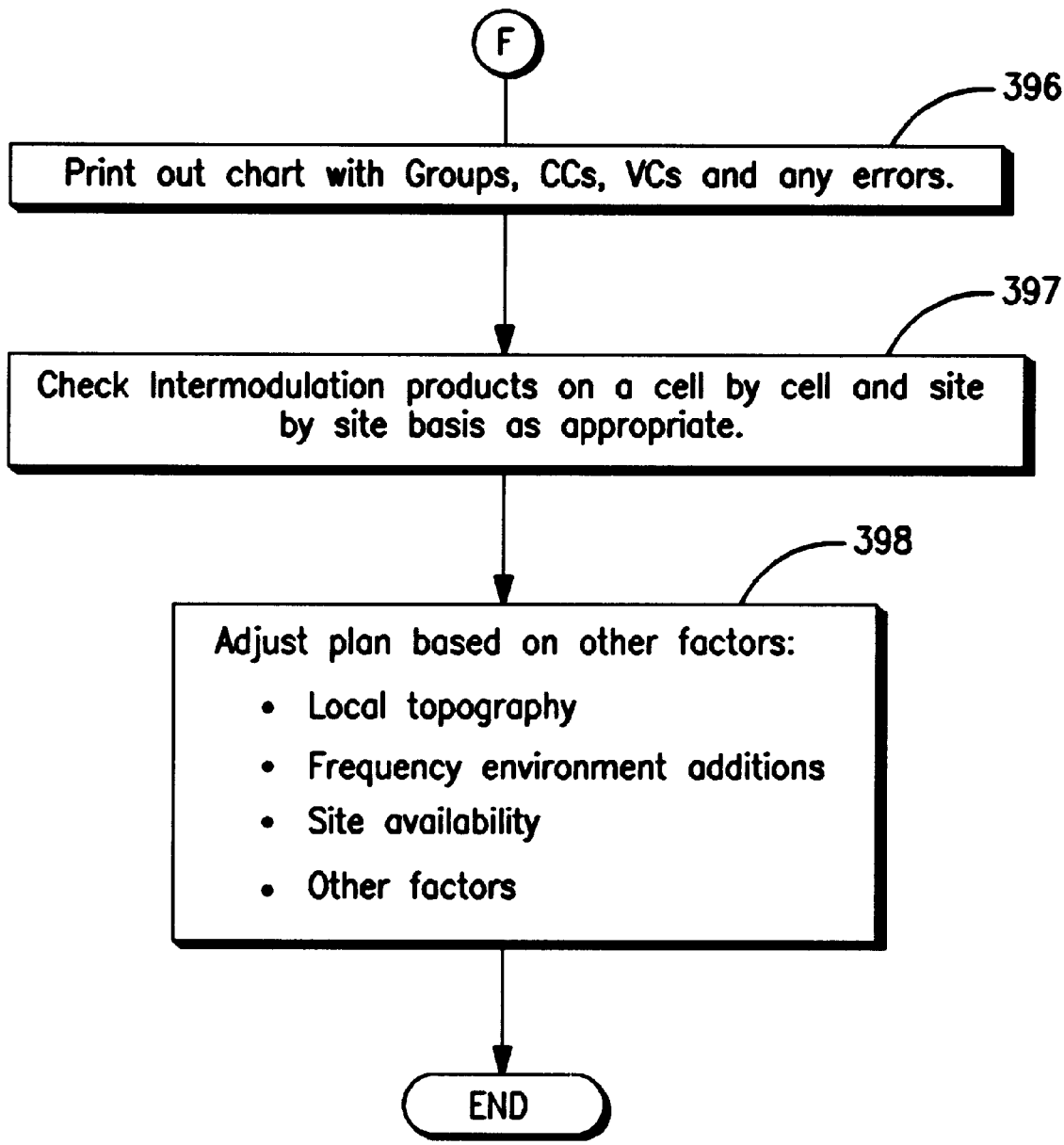

Computer 202 may then adjust plan 256 to accommodate the best separation decision (FIG. 5F, block 394). In this example, compute 202 performs step 394 by separating the 27.5 kHz offset frequencies so that there are a minimum within each channel group. Computer 202 then takes the group with the highest selected offset condition number, and moves the first offset condition frequency to the nearest adjacent group that does not have any with this condition. Computer 202 iteratively performs this process until all groups have less than or equal to the maximum number of selected offset frequencies (block 394, decision block 395). At this point, computer 202 may print out plan 256 (FIG. 5F, block 396). Additional, conventional software running on computer 202 (and/or other techniques) may be used to check plan 256 for intermodulation products on a cell-by-cell and site-by-site basis as appropriate (FIG. 5G, block 397). Human input may be used to adjust plan 256 based on other, more complex factors such as local topography, frequency environment conditions, site availability, and other factors (block 398).

Figure 6:
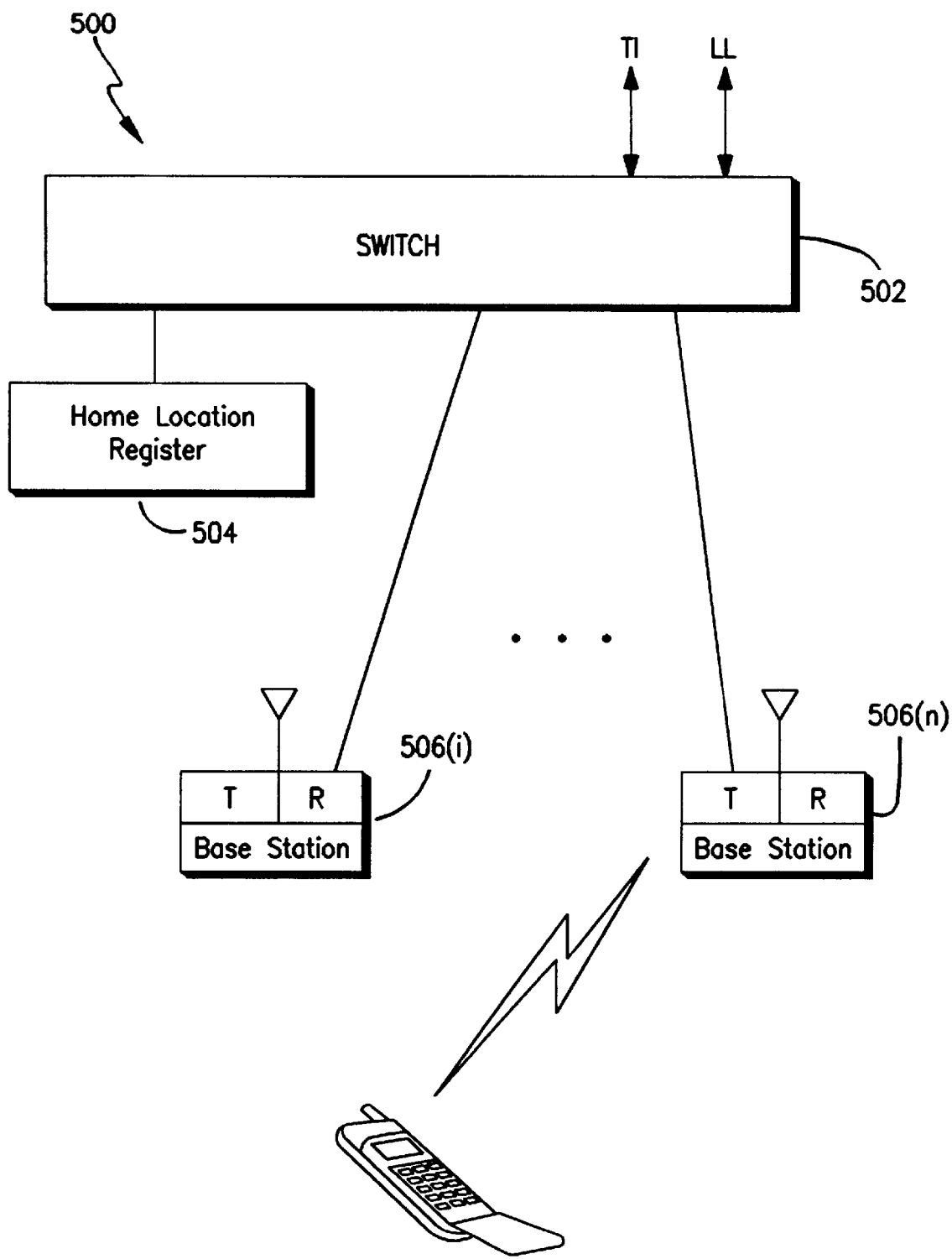
FIG. 6 shows an example downbanded cellular system using a frequency plan provided by the FIG. 5 system.

The resulting plan 256 may be provided to the operator of a downbanded cellular system 500 of the type shown in FIG. 6. Downbanded cellular system 500 in this example includes a mobile switching center 502 coupled to a home location register 504, and a plurality of base stations 506 such as, for example, Ericsson's RBS 884 micro radio base stations modified for the new frequency spectrum. The operator of system 500 may use frequency plan 256 to program the transmit and receive frequencies of each of base stations 506 to minimize interference while maximizing traffic handling capacity of system 500.

More Detailed Process Example

The following is a still more detailed summary of example steps that may be performed to provide frequency planning (see FIGS. 5A–5G):

1. Generate a frequency list for the new 30 kHz channels.
1.1. Associate the appropriate channel numbers.
1.2. Determine probability block for each channel.
1.3. Remove individual or groups of channels. (channels below channel number 166 for example)
1.4. Create a first pass channel plan using the default channel groupings (3/9, 4/12 or 7/21). This will be used during the "budgeting process" or if the customer has contiguous spectrum.
   1.4.1. For contiguous spectrum blocks:
      1.4.1.1. Channels are allocated to each group beginning with the lowest channel number being associated with frequency group A1.
      1.4.1.2. Control Channels are allocated from the highest probability block covered.
1.5. Calculate upper and lower guard bands for each channel.
   1.5.1. There are six possible adjacent channel offsets (27.5, 32.5, 37.5, 42.5, 47.5, and 52.5 kHz) in the frequency planning scenarios.
   1.5.2. In one scenario, five offsets (27.5, 32.5, 37.5, 42.5, and 47.5 kHz) are associated with channels owned by another operator.
   1.5.3. The 52.5 kHz or greater offset is associated with channels owned by the operator.
   1.5.4. Other scenarios are variants of the above listed conditions, and can be simplified out with respect to the adjacent channel interference issues.
1.6. Impacts due to non-symmetric interference puts higher weight on the Lower Guard Band (UGB) when selecting control channels.
1.7. The 25 kHz spectral mask enforces reduced adjacent channel interference. This spectrum presently allows operators with adjacent channels within a geographic area.
2. Select the channel grouping (for example, either 3/9, 4/12 or 7/21).
3. Select the Control Channels
3.1. The operator needs to select the desired characteristics, type and number of control channels. Characteristics include:
   3.1.1. Fast Access
      3.1.1.1. Those channels within the highest probability block regardless of offset.
   3.1.2. Best isolation
      3.1.2.1. Those channels with 30 kHz on both UGB and Lower Guard Band (LGB).
      3.1.2.2. Those channels with 30 kHz on UGB and 25 kHz Lower Guard Band (LGB).

3.1.2.3. Those channels with 25 kHz on UGB and 25 kHz Lower Guard Band (LGB).
3.1.2.4. This pattern repeats until the channels with no guard band are selected.
3.1.3. Minimum Offset
3.1.3.1. This is the opposite of 3.1.2 above, i.e., 27.5 kHz offset would be chosen first.
3.1.4. Other factors regarding control channel selection
3.2. Channel numbers are ordered in numerically increasing order such that the lowest channel number is associated with channel group A1, the next lowest with group B1, and so on, through the last channel group.
3.2.1. If there are more channels than needed for the channel groups, control channel selection will be based on the highest probability blocks (see Table IV).
3.2.2. These channels will act as the first pass control channels.
3.2.3. Several back up channels may be necessary due to the frequency environment.
3.2.4. When necessary, back up channels are put into the group structure per 3.2. All successive channels are shifted to the appropriate group.
4. Associate the voice channels with the channel groups.
4.1. Remove individual or groups of channels. (27.5 kHz offset for example)
4.2. The remaining channel numbers are listed in numerically increasing order such that the lowest channel number is associated with channel group A1, the next lowest with B1, and so on, through the last channel group.
4.3. This process continues until all channels have been assigned to frequency groups. Classify voice channels in positions 1 to 21 (first frequencies in groups A1 through G3) as voice channels Level 1. Classify voice channels in positions 22 to 42 (second frequencies in groups A1 through G3) as voice channels Level 2. Classify all voice channels in this manner according to Level.
5. Determine frequency separation by comparing control channels per the offsets listed in Table III above. Separation between groups A1 and A2 in a 7/21 plan, for example, requires at least 210 kHz separation. This condition should always be met due to 3.2 above.
6. Compare Voice channel offsets
6.1. Compare channel offsets between control channels (CC) and voice channels (VC) per the offsets listed in Table III. For example, separation between A1 CC and A1 VC in a 7/21 plan require at least 630 kHz separation. Similar separations are required for all voice channels and the control channels.
6.2. Compare channel offsets between voice channels (CC) within a channel group per the offsets listed in Table III. Separation between A1 VC and A1 VC in a 7/21 plan require at least 630 kHz separation, for example.
6.3. Conditions 5 through 7 assume a single Antenna Near Part (ANP) per cell and 3 per site. These will depend on the parameters chosen by each RBS provider. (DBC can use a 4/12 plan and requires a 360 kHz separation within a cell.)
6.4. Process to correct separation issues
   6.4.1. Alternate all control channels from the group's present positions to the first alternate position. For example, CC A2 replaces CC A1, CC A3 replaces CC A2, and CC A1 replaces CC A3, CC B2 replaces CC B1, and so on.
   6.4.2. Compare versus steps 6.1 through 6.3. If successful in achieving the correct separation, go to Intennod check; otherwise, go to next step after recording the number of offset problems.
   6.4.3. Alternate all control channels from the group's present positions to the second alternate position. For example, CC A3 replaces CC A1, CC A1 replaces CC A2, CC A2 replaces CC A3, CC B3 replaces CC B1, and so on.
   6.4.4. Compare versus steps 6.1 through 6.3. If successful in achieving the correct separation, go to Intermod check; otherwise, go to next step after recording the number of offset problems.
   6.4.5. Alternate all control channels from the group's present positions to the third alternate position. For example, CC A3 replaces CC A1, and CC A1 replaces CC A3, CC B3 replaces CC B1, and so on.
   6.4.6. Compare versus steps 6.1 through 6.3. If successful in achieving the correct separation, go to Intermod check; otherwise, go to next step after recording the number of offset problems.
6.5. Compare number of offset problems and select the combination with the least number of offset problems as the base frequency plan.
7. Optimize the base frequency plan to achieve best frequency separation using any/all of the following three alternatives:
replace a portion of the CC block,
begin alternating the control channel positions, and/or
begin alternating the voice channel positions.
7.1. Replace a portion of the control channel block.
   7.1.1. Utilize the alternate CC found above (3.2). Choose the number necessary that is equivalent to the least number of offset problems if possible.
   7.1.2. Replace those frequencies that have the most offset problems in the lowest groups first.
   7.1.3. Begin at step 5.0 and repeat until all alternate control channels are utilized.
   7.1.4. If successful in achieving the correct separation, go to Intermod check; otherwise go to Step 7.2 after recording the number of offset problems.
7.2. Alternate Control Channel Positions
   7.2.1. Utilizing the base frequency plan, increment all control channels from present group positions to the next position. For example, CC A1 replaces CC G3, and CC B1 replaces CC A1, CC C1 replaces CC B1, and so on.
   7.2.2. Compare versus steps 5.0 through 6.3.
      7.2.2.1. Record the number of offset problems.
      7.2.2.2. Repeat 7.2.1 until all channel positions have been occupied or successful in achieving the correct separation.
      7.2.2.3. Channel grouping with the least offset problems is the new base frequency plan
      7.2.2.4. If successful in achieving the correct separation, go to Intermod check; otherwise go to
7.3. Alternate Voice Channel Positions.
   7.3.1. Utilizing the base frequency plan:
      7.3.1.1. Determine the number of offset problems across a VC level and "down" a frequency group.
      7.3.1.2. Select optimization either across VC levels or Down frequency groups.
      7.3.1.3. Select the first VC in the affected Level with an offset problem.
      7.3.1.4. If there is a CC offset problem:
         7.3.1.4.1. Move VC from group 1 to group 2 or group 3 within VC level, from group 2 to group 3 within VC level or group 1 in the next level ,or from group 3 to group 1 or group 2 of the next level, depending on starting location.

7.3.1.4.2. Compare per step 6.1 through 6.3. (2 iterations max.)

7.3.1.4.3. If a channel is moved into either of the alternate groups without reducing the number of offset problems, return the frequency to its starting point.

7.3.1.4.4. Select the number of channels above the VC equivalent to the voice channel grouping, i.e. 21 channels above in a 7/21 plan.

7.3.1.4.5. Move the VC from the present position to the next channel found in 7.3.1.4.4.

7.3.1.4.6. Compare per step 6.1 through 6.3.

7.3.1.4.7. If a channel is moved into the alternate group without reducing the number of offset problems, return the frequency to its starting point unless in the last Voice Channel Level; otherwise go to next offset problem 7.3.1.3.

7.3.1.4.7.1. Last Voice Channel Level:

7.3.1.4.7.2. Attempt to populate any open frequency positions with the offending channel.

7.3.1.4.7.3. If no open positions available replace to position and report error.

7.3.1.5. If there is a VC offset problem, performs same steps as 7.3.1.4 except steps . . . 1 through . . . 3 are skipped, that is:

7.3.1.5.1. Select the number of channels above the VC equivalent to the voice channel grouping, i.e. 21 channels above in a 7/21 plan.

7.3.1.5.2. Move the VC from the present position to the next channel found in 7.3.1.5.1.

7.3.1.5.3. Compare per step 6.1 through 6.3.

7.3.1.5.4. If a channel is moved into the alternate group without reducing the number of offset problems, return the frequency to its starting point unless in the last Voice Channel Level; otherwise go to next offset problem 7.3.1.3.

7.3.1.5.4.1. Last Voice Channel Level:

7.3.1.5.4.2. Attempt to populate any open frequency positions with the offending channel.

7.3.1.5.4.3. If no open positions available replace to position and report error.

8. Adjust the channel plan to accommodate the Best Separation decision in 3.1.2; otherwise go to next step. This means separating the 27.5 kHz offset frequencies so that there are minimum number within each channel group.

8.1. Take the group with the highest selected offset condition number and move the first offset condition frequency to the nearest adjacent group that does not have any with this condition. (Prefer to go to the first higher numbered group found.)

8.2. Compare per step 6.1 through 6.3. 8.3. Repeat until all groups have less than or equal to the maximum number of selected offset frequencies.

9. Print out chart with Groups, CCs, VCs and any errors.

10. Check Intermodulation products on a cell by cell and site by site basis as appropriate.

11. End.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of deriving discontiguous RF operating frequencies for a radio communications system, the method comprising:

(a) tentatively assigning transmit channel center frequencies for a group of RF base station transmitters operating within at least one discontiguous portion of the radio frequency spectrum based on a frequency reuse plan to provide a first block of adjacent transmit channels at a first regular channel spacing; and (b) optimally shifting the tentatively assigned channel center frequencies of said first block of adjacent transmit channels to minimize interference with a second block of channels adjacent to the discontiguous spectrum portion, said second block of channels having a second regular channel spacing different from said first channel spacing in order to provide a guardband between said first block of channels and said second block of channels, said guardband having a bandwidth that minimizes interference between said first and second blocks of channels while maximizing the number of channels within said first block of channels.

2. A method as in claim 1 further including the step of transmitting radio signals from the RF base station groups over the optimized, assigned frequencies.

3. A method as in claim 1 wherein step (a) includes assigning the frequencies to groups of spatially separated base stations within a cellular radio system.

4. A method as in claim 1 wherein the optimizing step (b) includes replacing portions of control channel blocks to achieve required frequency separation.

5. A method as in claim 1 wherein the optimizing step (b) includes alternating control channel positions to achieve required frequency separation.

6. A method as in claim 1 wherein the optimizing step (b) includes alternating voice channel positions to achieve required frequency separation.

7. A method as in claim 1 further including the step of performing an intermodulation test on the optimized assigned frequencies.

8. A method as in claim 1 wherein optimizing step (b) includes iteratively substituting portions of an assigned frequency plan and testing the plan to determine whether required frequency separation is achieved.

9. A method as in claim 1 wherein step (a) includes the step of mapping one channelization onto another, and step (b) includes using sufficient spatial separation between the base stations to offset frequency overlap resulting from the channelization mapping.

10. A method of deriving a frequency plan for a cellular radio communications system, the method comprising:

(a) developing a channel center frequency list for at least one discontiguous portion of the radio frequency spectrum by mapping a first channelization providing a first block of adjacent channels of a first regular channel spacing onto a second channelization providing a second block of adjacent channels of a second regular channel spacing different from said first spacing;

(b) tentatively assigning center frequencies from the channel center frequency list to cellular RF base station groups based on a cellular frequency reuse plan to provide said first channelization in said discontiguous spectrum portion;

(c) optimally shifting the assigned center frequencies to minimize interference with said second block of channels adjacent to the discontiguous spectrum portion, so as to provide a guardband between said first channel block and said second channel block, said guardband having a bandwidth that minimizes interference between said first channel block and said second channel block while maximizing the number of channels in said first channel block; and (d) transmitting radio signals from the RF base station groups to cellular radiotelephones over the optimally shifted, assigned frequencies.

11. A method as in claim 10 wherein step (a) includes the step of mapping a 30 kHz downbanded cellular channelization onto a 25 kHz Specialized Mobile Radio band channelization.

12. A method as in claim 10 wherein the optimizing step (c) includes iteratively replacing portions of control channel blocks to achieve required frequency separation.

13. A method as in claim 10 wherein the optimizing step (c) includes iteratively alternating control channel positions to achieve required frequency separation.

14. A method as in claim 10 wherein the optimizing step (c) includes iteratively alternating voice channel positions to achieve required frequency separation.

15. A method as in claim 10 further including the step of performing an intermodulation test on the optimized assigned frequencies.

16. A method as in claim 10 wherein optimizing step (c) includes iteratively substituting portions of an assigned frequency plan and testing the plan to determine whether required frequency separation is achieved.

17. A method as in claim 1 wherein step (c) includes using spatial separation between the repeaters to offset overlap resulting from the channelization mapping.

18. A downbanded cellular radio system operating on a discontiguous portion of the RF spectrum on a first block of adjacent channels having a first regular channel spacing that differs from a second block of channels in a portion of the RF spectrum adjacent said discontiguous portion, said system comprising:

a switch, a home location register, a plurality of spatially separated repeaters operating on a first block of channel center frequencies that are regularly spaced and arranged in accordance with a frequency reuse plan, and a plurality of cellular telephones communicating via wireless transmissions with the repeaters, wherein the repeater operating frequencies are assigned within at least one discontiguous portion of the radio spectrum to provide a channelization that differs from the channelization provided in said spectrum portion that lies adjacent to the discontiguous spectrum portion, and the operating frequencies are optimally shifted so that spatial separation between the repeaters is used to minimize interference with channels in the spectrum portion adjacent to the discontiguous spectrum portion and a guardband is provided between said discontiguous spectrum portion channelization and said channelization of said spectrum portion adjacent thereto, said guardband having a bandwidth that minimizes interference while maximizing the number of channels within said discontinuous spectrum portion.

19. In a downbanded cellular radiotelephone communications system that communicates radio signals over a block of adjacent radio channels having center frequencies that nominally differ from the center frequencies defined by the channelization of a discontiguous portion of the RF spectrum the downbanded system operates within, an improvement comprising:

selecting control channels to provide best isolation and highest mobile telephone seek probability while optimizing the control channel selection to minimize adjacent channel interference, and shifting the center frequencies of said block of adjacent radio channels to provide a guardband between said discontiguous portion channelization and a spectrum portion adjacent thereto having a different channelization, said guardband having a bandwidth that minimizes adjacent channel interference while maximizing the number of channels within said discontiguous spectrum portion.

* * * * *